United States Patent
Lim et al.

(10) Patent No.: US 9,450,767 B2
(45) Date of Patent: Sep. 20, 2016

(54) PCRF AND PCC RULE SETTING METHOD IN A MOBILE COMMUNICATION NETWORK

(71) Applicants: Samsung Electronics Co., Ltd., Gyeonggi-do (KR); Research & Business Foundation Sungkyunkwan University, Gyeonggi-do (KR)

(72) Inventors: Han-Na Lim, Seoul (KR); Song-Yean Cho, Seoul (KR); Jung-Je Son, Gyeonggi-do (KR); Sang-Soo Jeong, Gyeonggi-do (KR); Min Young Chung, Seoul (KR); Bum-Gon Choi, Gyeonggi-do (KR)

(73) Assignees: Samsung Electronics Co., Ltd (KR); Research & Business Foundation Sungkyunkwan University (KR)

( * ) Notice: Subject to any disclaimer, the term of this patent is extended or adjusted under 35 U.S.C. 154(b) by 231 days.

(21) Appl. No.: 14/347,942
(22) PCT Filed: Sep. 28, 2012
(86) PCT No.: PCT/KR2012/007929
§ 371 (c)(1),
(2) Date: Mar. 27, 2014
(87) PCT Pub. No.: WO2013/048187
PCT Pub. Date: Apr. 4, 2013

(65) Prior Publication Data
US 2014/0233432 A1    Aug. 21, 2014

(30) Foreign Application Priority Data
Sep. 28, 2011 (KR) .................. 10-2011-0098634

(51) Int. Cl.
*H04L 12/16* (2006.01)
*H04L 12/14* (2006.01)
(Continued)

(52) U.S. Cl.
CPC ....... *H04L 12/1407* (2013.01); *H04L 41/0893* (2013.01); *H04L 63/20* (2013.01); *H04M 15/66* (2013.01); *H04W 12/08* (2013.01); *H04L 12/1435* (2013.01); *H04L 12/1485* (2013.01)

(58) Field of Classification Search
None
See application file for complete search history.

(56) References Cited

U.S. PATENT DOCUMENTS

| 6,073,017 A | 6/2000 | Xu et al. |
| 2010/0150003 A1 | 6/2010 | Andreasen et al. |

(Continued)

FOREIGN PATENT DOCUMENTS

KR    1020080112946    12/2008

OTHER PUBLICATIONS

PCT/ISA/237 Written Opinion issued on PCT/KR2012/007929 (pp. 3).

(Continued)

*Primary Examiner* — Minh-Trang Nguyen
(74) *Attorney, Agent, or Firm* — The Farrell Law Firm, P.C.

(57) ABSTRACT

A PCEF for setting a PCC rule in a mobile communication network includes: a receiver for receiving a command message including a monitoring key list including at least one monitoring key corresponding to a PCC rule and a number of instances monitored in a corresponding service, from a Policy and Charging Rules Function (PCRF); a setting unit for setting the PCC rule based on the command message and setting a monitoring key according to the at least one monitoring key; and a monitoring processor for setting a range of monitoring in consideration of the number of instances and the at least one monitoring key, and performing monitoring based on the set range of the monitoring.

15 Claims, 9 Drawing Sheets

(51) Int. Cl.
*H04L 12/24* (2006.01)
*H04L 29/06* (2006.01)
*H04W 12/08* (2009.01)
*H04M 15/00* (2006.01)

(56) References Cited

U.S. PATENT DOCUMENTS

| | | |
|---|---|---|
| 2011/0201303 A1 | 8/2011 | Cutler et al. |
| 2011/0202485 A1 | 8/2011 | Cutler et al. |
| 2012/0081557 A1* | 4/2012 | Kupinsky ........... H04L 12/1407 348/207.1 |
| 2012/0129488 A1* | 5/2012 | Patterson .............. H04M 15/50 455/406 |
| 2012/0224677 A1* | 9/2012 | Riley .................... H04M 15/66 379/93.01 |
| 2012/0278472 A1* | 11/2012 | Ellis .................... H04L 12/1407 709/224 |

OTHER PUBLICATIONS

PCT/ISA/210 Search Report issued on PCT/KR2012/007929 (pp. 3).

* cited by examiner

Fig. 8C

```
Monitoring-Key-List ::= <AVP Header: XXXX >
                    { Number-of-Instances }    /* Value: 3 */  — 831
                    [ Monitoring-Key ]         /* Value: A */  — 833
                    [ Monitoring-Key ]         /* Value: B */  — 835
                    * [ AVP ]
```

Fig. 8D

```
Monitoring-Key-List ::= <AVP Header: XXXX >
                    { Number-of-Instances }    /* Value: 3 */  — 841
                    [ Monitoring-Key ]         /* Value: A */  — 843
                    [ Monitoring-Key ]         /* Value: B */  — 845
                    * [ AVP ]
```

Fig. 8E

```
Monitoring-Key-List ::= <AVP Header: XXXX >
                    { Number-of-Instances }    /* Value: 2 */  — 850
                    [ Monitoring-Key ]         /* Value: A */  — 855
                    * [ AVP ]
```

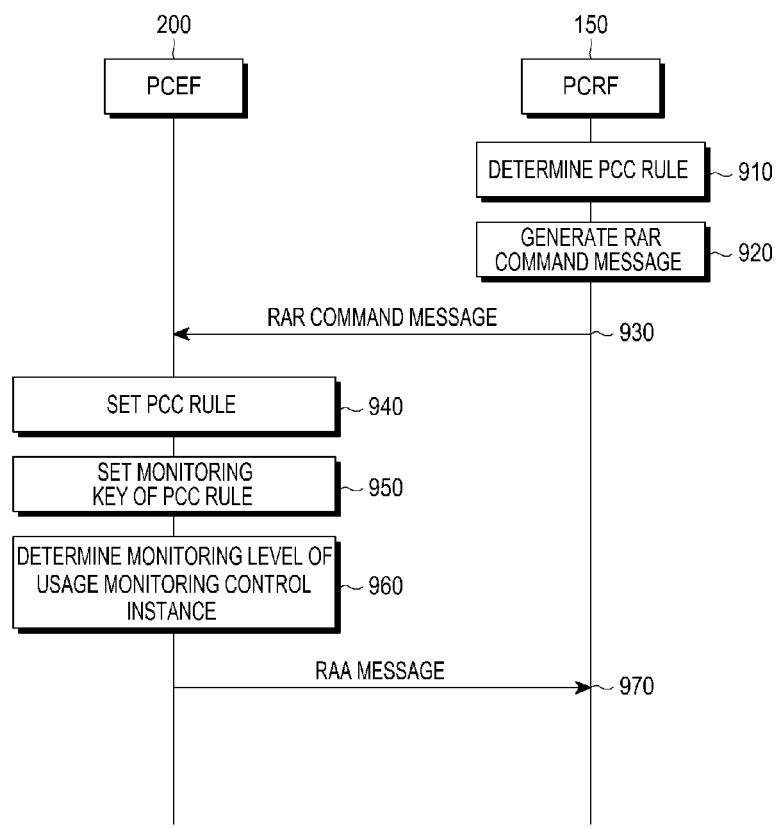

Fig. 9

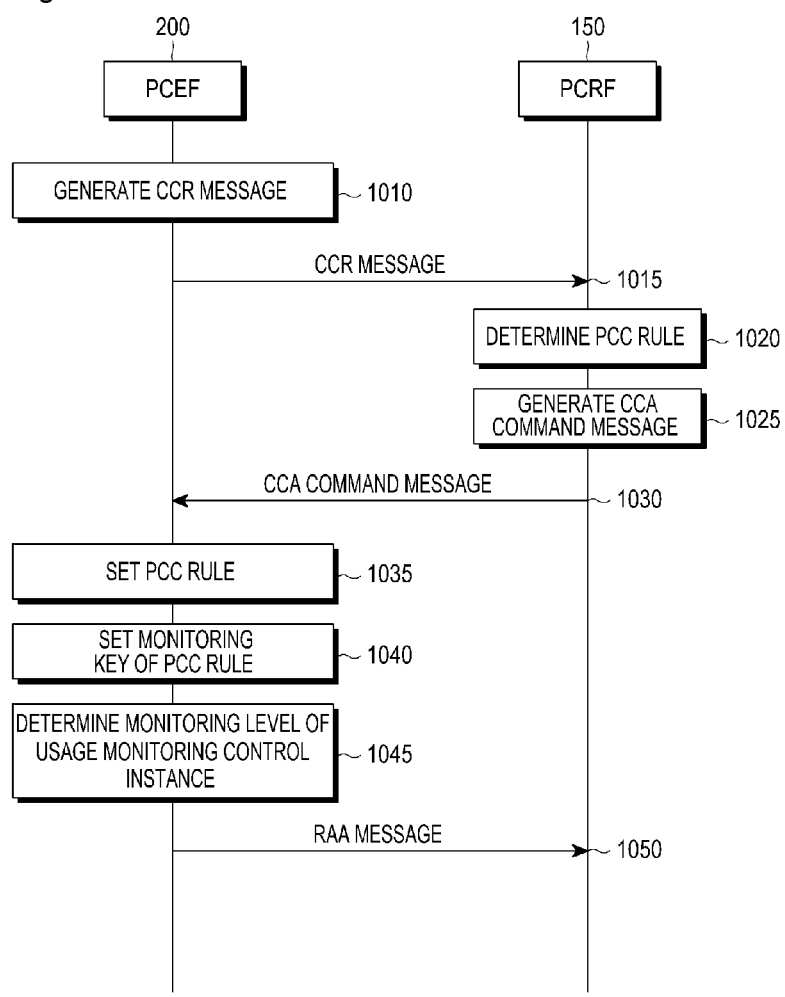

Fig. 13

```
Charging-Rule-Definition ::= <AVP Header: 1003 >
                { Charging-Rule-Name }        /* Value: PCC rule 1 */
                ...
                [ Monitoring-Key-LIst ]                                    ~1310
                ...
                * [ AVP ]

Monitoring-Key-List ::= <AVP Header: XXXX >
                { Number-of-Instances }       /* Value: 0 */               ~1315
                * [ AVP ]

Charging-Rule-Definition ::= <AVP Header: 1003 >
                { Charging-Rule-Name }        /* Value: PCC rule 2 */
                ...
                [ Monitoring-Key-LIst ]                                    ~1320
                ...
                * [ AVP ]

Monitoring-Key-List ::= <AVP Header: XXXX >
                { Number-of-Instances }       /* Value: 1 */
                [ Monitoring-Key ]            /* Value: A */               ~1325
                * [ AVP ]

Charging-Rule-Definition ::= <AVP Header: 1003 >
                { Charging-Rule-Name }        /* Value: PCC rule 3 */
                ...
                [ Monitoring-Key-LIst ]                                    ~1330
                ...
                * [ AVP ]

Monitoring-Key-List ::= <AVP Header: XXXX >
                { Number-of-Instances }       /* Value: 2 */
                [ Monitoring-Key ]            /* Value: A */               ~1335
                [ Monitoring-Key ]            /* Value: B */
                * [ AVP ]
```

```
Usage-Monitoring-Information ::= <AVP Header: 1067 >
                [ Monitoring-Key ]            /* Value: A */
                [ Granted-Service-Unit ]      /* Value: 50 Mbytes */
                [ Used-Service-Unit ]
                [ Usage-Monitoring-Level ]    /* Value: PCC_Rule_LEVEL(1) */
                [ Usage-Monitoring-Report ]
                [ Usage-Monitoring-Support ]
                * [ AVP ]

Usage-Monitoring-Information ::= <AVP Header: 1067 >
                [ Monitoring-Key ]            /* Value: B */
                [ Granted-Service-Unit ]      /* Value: 10 Mbytes */
                [ Used-Service-Unit ]
                [ Usage-Monitoring-Level ]    /* Value: PCC_Rule_LEVEL(1) */
                [ Usage-Monitoring-Report ]
                [ Usage-Monitoring-Support ]
                * [ AVP ]
```

1420

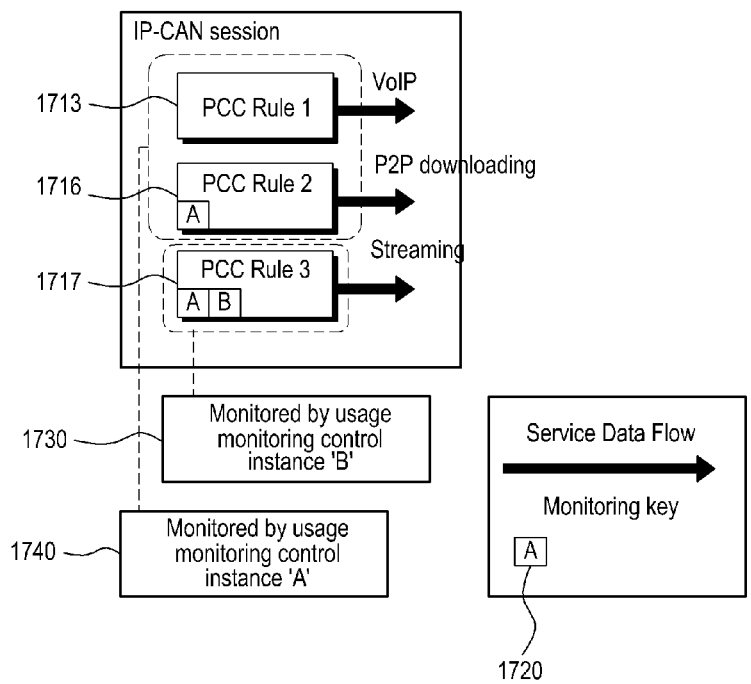

PCRF AND PCC RULE SETTING METHOD IN A MOBILE COMMUNICATION NETWORK

TECHNICAL FIELD

The present invention relates generally to a mobile communication network, and more particularly, to an apparatus and a method for setting a Policy and Charging Control (PCC) rule in a mobile communication network. The present invention relates generally to a mobile communication network, and more particularly, to an apparatus and a method for setting a Policy and Charging Control (PCC) rule in a mobile communication network.

BACKGROUND ART

In response to the rapid development of mobile communication and Internet technologies and various requirements of subscribers, recent mobile communication services have reached a stage capable of providing not only the conventional voice communication service but also a high speed packet service which enables transmission of large capacity digital data including an e-mail or a still image through a mobile communication terminal. As a result, mobile communication systems are evolving from the voice-based Circuit Switched (CS) domain to a packet-based Packet Switched (PS) domain.

The Core Network (CN) for providing a multimedia service through the Internet has changed from the existing line-based core network into a packet-based core network, and is further evolving into an Internet Protocol (IP) based core network. A communication system which provides an IP multimedia service to subscribers through an IP based core network is called an IP Multimedia Subsystem (IMS). In the 3rd Generation Partnership Project (3GPP)/3GPP2, various researches for smoothly providing all IP services through an IMS are in progress.

Meanwhile, a mobile communication system establishes a Policy and Charging Control rule (hereinafter, referred to as "PCC rule") for service quality policies and use of services, and provides a service to terminals according to the established PCC rule. In other words, the Policy and Charging Control (PCC) corresponds to a technology of recognizing a type of a service and determining a service quality (Quality of Service; QoS) and a charging policy proper for the service. Entities playing an important role in a PCC structure include a Policy and Charging Rules Function (PCRF) and a Policy and Charging Enforcement Function (PCEF).

The PCRF corresponds to a device for dynamically applying QoSs and charging policies discriminated according to services and determines the PCC rule based on information on a service and information on a user. The PCEF detects a service provided to a user, receives a PCC rule from a PCRF for charging control and QoS of the detected service, applies a QoS policy discriminated for each service based on the PCC rule received from the PCRF, and then generates charging information according to the QoS policy. That is, the PCRF transmits a command message to the PCEF, so as to establish a new PCC rule for the PCEF or amend or remove an already established PCC rule.

DISCLOSURE OF INVENTION

Technical Problem

However, since the PCEF should establish a PCC rule for each of multiple services applied to a mobile communication terminal of a user, a plurality of PCC rules may be set according to the services applied to the mobile communication terminal and the number of Service Data Flow (SDF) templates configured by filters for detecting services corresponding to the PCC rule increases, which may increase the related signaling. Further, in the conventional method, in order to change the PCC rule, a new PCC rule can be set after an already set PCC rule is removed, which also may increase the signaling.

Solution to Problem

Accordingly, an aspect of the present invention is to provide a Policy and Charging Enforcement Function (PCEF) and a PCC rule setting method in a mobile communication network in which one service can be monitored in at least two PCC rules.

Another aspect of the present invention is to provide a PCEF and a PCC rule setting method in a mobile communication network in which a PCC rule can be added, deleted, or changed.

Another aspect of the present invention is to provide a PCEF and a PCC rule setting method in a mobile communication network in which a particular service and application can be excluded from the monitoring of a PCC rule.

In accordance with an aspect of the present invention, there is provided a Policy and Charging Enforcement Function (PCEF) for setting a Policy and Charging Control (PCC) rule in a mobile communication network.

The PCEF includes: a receiver for receiving a command message including a monitoring key list including at least one monitoring key corresponding to a PCC rule and a number of instances monitored in a corresponding service, from a Policy and Charging Rules Function (PCRF); a setting unit for setting the PCC rule based on the command message and setting a monitoring key of the PCC rule according to the at least one monitoring key; and a monitoring processor for setting a range of monitoring in consideration of the number of instances and the at least one monitoring key, and performing monitoring based on the set range of the monitoring.

In accordance with another aspect of the present invention, there is provided a method of setting a Policy and Charging Control (PCC) rule by a Policy and Charging Enforcement Function (PCEF) in a mobile communication network.

The method includes: receiving a command message including a monitoring key list including at least one monitoring key corresponding to a PCC rule and a number of instances monitored in a corresponding service, from a Policy and Charging Rules Function (PCRF); setting the PCC rule based on the command message; setting a monitoring key of the PCC rule according to the at least one monitoring key; and setting a range of monitoring in consideration of the number of instances and the at least one monitoring key, and performing monitoring based on the set range of the monitoring.

Advantageous Effects of Invention

In a PCEF and a PCC rule setting method in a mobile communication network according to an embodiment of the present invention, one PCC rule includes a monitoring group and it is thus possible to enable one service to be monitored in at least two PCC rules.

A PCEF and a PCC rule setting method in a mobile communication network according to an embodiment of the present invention can reduce the signaling, the number of service data flow templates, and the PCC rule set in the PCEF.

Also, a PCEF and a PCC rule setting method in a mobile communication network according to an embodiment of the present invention can easily add, delete, or change a PCC rule, and can change the PCC rule without additional signaling.

Further, a PCEF and a PCC rule setting method in a mobile communication network according to an embodiment of the present invention can exclude a particular service and application from monitoring of the PCC rule.

BRIEF DESCRIPTION OF DRAWINGS

The above and other aspects, features, and advantages of the present invention will be more apparent from the following detailed description taken in conjunction with the accompanying drawings, in which:

FIG. 9 is a flowchart illustrating a method of setting a PCC rule by a PCC rule setting system according to an embodiment of the present invention;

FIG. 10 is a flowchart illustrating a method of setting a PCC rule by a PCC rule setting system according to another embodiment of the present invention;

FIG. 13 is a view illustrating examples of a Monitoring-Key-List AVP and a Charging-Rule-Definition AVP for application of the PCC rule of FIG. 12;

FIG. 14 is a view illustrating examples of a Usage-Monitoring-Information AVP for application of the PCC rule of FIG. 12;

FIG. 17 is a view illustrating an example of application of a PCC rule according to another embodiment of the present invention;

FIG. 18 is a view illustrating examples of a Monitoring-Key-List AVP and a Charging-Rule-Definition AVP for application of the PCC rule of FIG. 17.

BEST MODE FOR CARRYING OUT THE INVENTION

Figure 1:
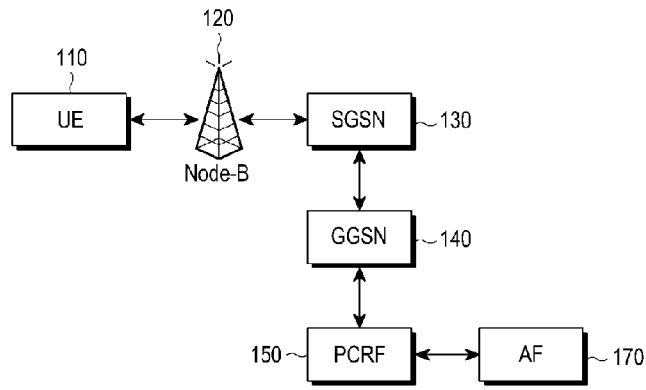
FIG. 1 is a block diagram schematically illustrating a mobile communication network including a system for setting a PCC rule according to an embodiment of the present invention.

Hereinafter, various embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

Further, although terms are properly modified, unified or separated for clear understanding of one skilled in the art in the following description of embodiments in order to effectively describe the present invention, the present invention is not limited thereto.

The following description on an embodiment of the present invention discusses a scheme of setting a Policy and Charging Control (PCC) rule and a monitoring key of the PCC rule based on a command message received from a Policy and Charging Rules Function (PCRF) in detail. In addition, the following description of other embodiments of the present invention discusses a scheme of setting a range of monitoring based on the command message and performing the monitoring in detail.

Hereinafter, an embodiment of the present invention will be described in detail with reference to the accompanying drawings.

FIG. 1 is a block diagram schematically illustrating a mobile communication network including a system for setting a PCC rule according to an embodiment of the present invention. The mobile communication network including a system for setting a PCC rule shown in FIG. 1 is just an example and it goes without saying that the system for setting a PCC rule can be applied any mobile communication network. Especially, the PCC rule may be also applied to an Evolved Packet System (EPS), wherein a Packet Data Network (PDN) Gateway (P-GW) performs, as a substitute, the operation of a Gateway General Packet Radio Service (GPRS) Support Node (GGSN) 140 which will be described later.

Referring to FIG. 1, a mobile communication network includes a Node-B 120, a Serving GPRS Support Node (SGSN) 130, a GGSN 140, a PCRF 150, and an Application Function (AF) 170.

A User Equipment (UE) 110 is connected with the mobile communication network through the Node-B 120. The UE 110 corresponds to a terminal for performing a session setting procedure with the mobile communication network and transmitting or receiving packet data to or from the mobile communication network. The UE 110 transmits or receives packet data to or from the mobile communication network by using a Wireless Application Protocol which is a wireless Internet access protocol, a Microsoft Internet Explorer (MIE) based on a Hyper Text Markup Language (HTML) using a Hyper Text Transfer Protocol (HTTP), a Handheld Device Transport Protocol, a File Transfer Protocol (FTP), an XML Configuration Access Protocol (XCAP), etc.

The SGSN 130 corresponds to a service node for managing subscriber information and location information of the UE 110. The SGSN 130 may receive the location information from a Home Location Register (HLR) connected through a Mobile Application Protocol (MAP). The SGSN 130 is connected with a wireless network through an Iu interface and with the GGSN 140 through a Gn interface, so as to transmit or receive packet data, a control message, etc. That is to say, for the General Packet Radio Service (GPRS), the SGSN 130 has functions for management of the mobility of the UE 110, an outgoing and incoming signal processing procedure, session management for processing transmission or reception of packet data, an authentication and charging function, and a routing processing function of packet data. Meanwhile, the SGSN 130 manages the Quality of Service (QoS) of a wireless section.

The GGSN 140 corresponds to a serving node of an IP based packet, which provides high speed packet data for a packet data service of the GPRS. The GGPN allocates an IP address to the UE 110 for a packet data service, manages a session, and provides an interface for connecting the Internet network with a Wideband Code Division Multiple Access (WCDMA) and a routing processing function of packet data. Here, an interface for connecting the GGSN 140 with the Internet network is called a Gi interface, wherein the Gi interface processes a message received through the Gn interface and transmits the processed message to the Internet network.

The GGSN 140 manages a QoS of the IP section. In order to manage the QoS of an IP Multimedia Subsystem (IMS), the GGSN 140 includes a Policy and Charging Enforcement Function (PCEF).

The PCRF 150 performs a policy determination function for applying various charging policies and QoSs specified according to respective IMS service flows. The PCRF 150 determines a PCC rule for a packet service by using subscriber information and packet service information, etc. For example, the PCRF 150 may reflect information on charging for a unit packet or a unit time preset by user's selection, etc. in determining the PCC rule.

The AF 170 provides the PCRF 150 with data necessary for determination of the PCC rule by the PCRF 150.

Figure 2:
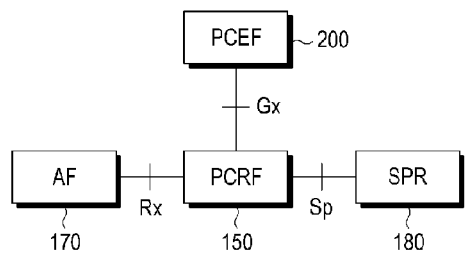
FIG. 2 is a block diagram illustrating a PCC structure including a PCC rule setting system according to an embodiment of the present invention.

FIG. 2 is a block diagram illustrating a PCC structure including a PCC rule setting system according to an embodiment of the present invention.

The PCC structure includes a PCRF 150, an AF 170, a Subscription Profile Repository (SPR) 180, and a PCEF 200.

The PCRF 150 performs service data flow detection, gate control, and network control relating to a flow based on charging to the PCEF 200 and QoS. The PCRF 150 receives session information and media information from the AF 170 and notifies the AF 170 of an event of a traffic plane. To this end, the PCRF 150 determines a PCC rule and the PCEF 200 sets the determined PCC rule. In this event, the PCRF 150 is connected with the AF 170 through an Rx interface and with the PCEF 200 installed within the GGSN 140 through a Gx interface. The PCRF 150 receives information necessary for determination of the PCC rule from the AF 170 or the GGSN 140. The information received from the AF 170 may be one or more combinations of session information, media information, and subscriber information, and the information received from the GGSN 140 may be one or more combinations of IP-Connectivity Access Network (IP-CAN) bearing information, request type information, and subscriber information.

The PCRF 150 generates a command message including a monitoring key list in order to transmit a PCC rule to the PCEF 200. The PCRF 150 transmits the generated command message to the PCEF 200. The PCRF 150 will be described below in more detail with reference to FIG. 3.

The AF 170 is a system for providing an IP based service, which refers to a Proxy Call Session Control Function (P-CSCF). The AF 170 corresponds to a point which the UE 110 meets when it accesses an IMS domain through an access network, and transfers a Session Initiation Protocol (SIP) register request to an Interrogating Call Session Control Function (I-CSCF). A Serving Call Session Control Function (S-CSCF) sets a call session and receives and processes an SIP message transferred from the UE 110.

The SPR 180 is a device for storing subscriber information relating to the UE 110. The SPR 180 is connected with the PCRF 150 through an Sp interface and provides the PCRF 150 with the subscriber information relating to the UE 110. Here, the subscriber information may include one or more combinations of information on time-based charging, information on packet-based charging, and information on charging discount.

The PCEF 200 includes a policy execution and charging functionality based flow, and is located within an IP edge node (which corresponds to, for example, a GGSN 140 in the case of GPRS, a PDSN in the case of CDMA, or an ACR in the case of ACR). The PCEF 200 provides functions of service data flow detection, user plane traffic handling, triggering control plane session management which allows IP-CAN, QoS handling, and service data flow estimation. Further, the PCEF 200 provides charging information in interlocking with an online or offline charging server.

The PCEF 200 receives a command message from the PCRF 150 in order to set a PCC rule. The PCEF 200 sets a PCC rule and a monitoring key corresponding to the PCC rule based on the command message received from the PCRF 150. Further, the PCEF 200 sets a range of the monitoring based on the command message received from the PCRF 150. The PCEF 200 will be described below in more detail with reference to FIG. 6.

Figure 3:
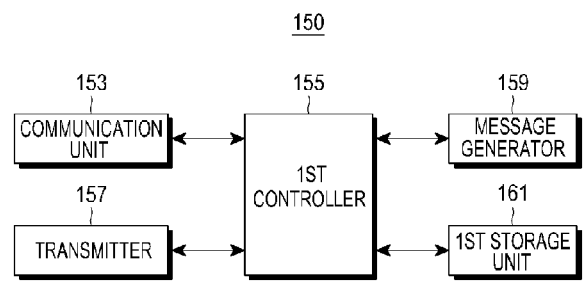
FIG. 3 is a block diagram illustrating a Policy and Charging Rules Function (PCRF) according to an embodiment of the present invention.

FIG. 3 is a block diagram illustrating a Policy and Charging Rules Function (PCRF) according to an embodiment of the present invention.

The PCRF 150 includes a communication unit 153, a first controller 155, a transmitter 157, a message generator 159, and a first storage unit 161.

The communication unit 153 accesses the PCEF 200 and receives data from the PCEF 200. For example, the communication unit 153 may receive a Credit Control Request (CCR) command message for requesting a PCC rule from the PCRF 150.

The first controller 155 controls general operations of the PCRF 150. That is, the first controller 155 controls the communication unit 153, the transmitter 157, the message generator 159, and the first storage unit 161, which are elements of the PCRF 150. For example, when receiving a CCR command message from the PCEF 200 through the communication unit 153, the first controller 155 may control the message generator 159 to generate a Credit Control Answer (CCA) command message to be transmitted to the PCEF 200. When it has not received a CCR command message from the PCEF 200 through the communication unit 153, the first controller 155 may control the message generator 159 to generate a Re-Auth Request (RAR) command message in order to set a PCC rule in the PCEF 200. When the message generator 159 generates a command message, the first controller 155 may control the transmitter 157 to cause the transmitter 157 to transmit the command message generated by the message generator 159.

The transmitter 157 accesses the PCEF 200 and transmits data to the PCEF 200. That is, the transmitter 157 transmits a command message generated by the message generator 159 to the PCEF 200.

The message generator 159 determines a PCC rule and creates a command message in order to set the determined PCC rule in the PCEF 200. That is, the message generator 159 generates a command message including a Charging-Rule-Install Attribute Value Pair (AVP) in order to install or amend a PCC rule in the PCEF 200. Here, the Charging-Rule-Install AVP includes a Charging-Rule-Definition AVP which indicates information on the PCC rule.

Figure 4:
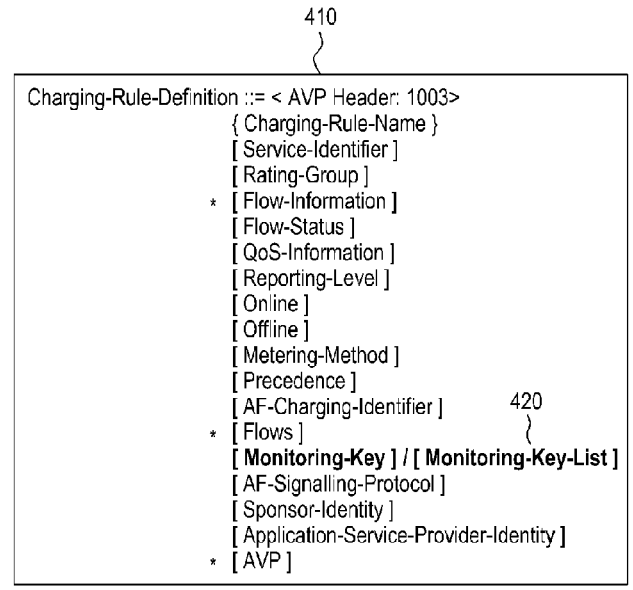
FIG. 4 is a view illustrating a Charging-Rule-Definition AVP included in a command message according to an embodiment of the present invention.

FIG. 4 is a view illustrating a Charging-Rule-Definition AVP included in a command message according to an embodiment of the present invention.

As shown in FIG. 4, the Charging-Rule-Definition AVP 410 may include one or more combinations of Charging-Rule-Name, Service-Identifier, Rating-Group, Flow-Information, Flow-Status, QoS-Information, Reporting-Level, Online, Offline, Metering-Method, Precedence, AF-Charging-Identifier, Flows, Monitoring-Key-List (or Monitoring-Key) 420, AF-Signalling-Protocol, Sponsor-Identity, and Application-Service-Provider-Identity AVP. Here, the Charging-Rule-Definition AVP may include only one AVP among the Monitoring-Key-List AVP and the Monitoring-Key AVP. The Charging-Rule-Name AVP refers to a name of a PCC rule determined by the message generator 159.

Meanwhile, the message generator 159 may generate a command message which makes a specific Charging-Rule-Install AVP correspond to each UE 110, in order to set a specific PCC rule for each UE 110.

Figure 5:
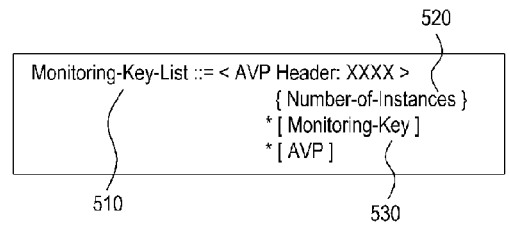
FIG. 5 is a view illustrating a Monitoring-Key-List AVP within a Charging-Rule-Definition AVP according to an embodiment of the present invention.

FIG. 5 is a view illustrating a Monitoring-Key-List AVP within a Charging-Rule-Definition AVP according to an embodiment of the present invention.

As shown in FIG. 5, a Monitoring-Key-List AVP within a Charging-Rule-Definition AVP includes a Number-of-Instances AVP 520 and a Monitoring-Key AVP 530. The Number-of-Instances AVP corresponds to a PCC rule, and either may include at least one Monitoring-Key AVP or may not include a Monitoring-Key AVP. That is, the monitoring key corresponds to an identifier for identifying a usage monitoring control instance for monitoring a PCC rule. Further, only when a monitoring key list includes a plurality of monitoring keys, it is possible to monitor a service and an application corresponding to a corresponding PCC rule in multiple monitoring groups.

The Number-of-Instances AVP indicates the number of usage monitoring control instances which monitor a corresponding PCC rule. The message generator 159 may request the PCEF 200 to perform one or more combinations of adding, deleting, and changing a currently allocated monitoring key in the PCC rule by using a value of the Number-of-Instances AVP.

The message generator 159 includes a Usage-Monitoring-Information AVP into a command message. The Usage-Monitoring-Information AVP indicates information on whether monitoring will be performed for each session level or group level and limit value information for reporting of usage to a usage monitoring control instance having a particular monitoring key. The message generator 159 requests interruption of monitoring of a corresponding monitoring key or reports service usage up to the present to the PCEF 200 through the Usage-Monitoring-Information AVP.

The message generator 159 sets different types of command messages according to whether a CCR command message has been received. In other words, when a CCR command message has been received through the communication unit 153, the message generator 159 may generate a CCA command message for responding to the CCR command message. When a CCR command message has not been received through the communication unit 153, the message generator 159 may generate a RAR command message in order to provide the PCEF 200 with a PCC rule.

The first storage unit 161 stores various programs for controlling general operations of the PCRF 150, various data generated by execution of the programs, and acquired data. For example, the first storage unit 161 may store a command message indicating a RAR command message or a CCA command message generated by the message generator 159. The first storage unit 161 may store a CCR command message through the communication unit 153.

In the meantime, the first storage unit 161 may provide necessary data in response to a request from the first controller 155, the transmitter 157, or the message generator 159. The first storage unit 161 may either be configured by an integrated memory or include a plurality of separate memories. For example, the first storage unit 161 may include a Read Only Memory (ROM), a Random Access Memory (RAM), a flash memory, etc.

Figure 6:
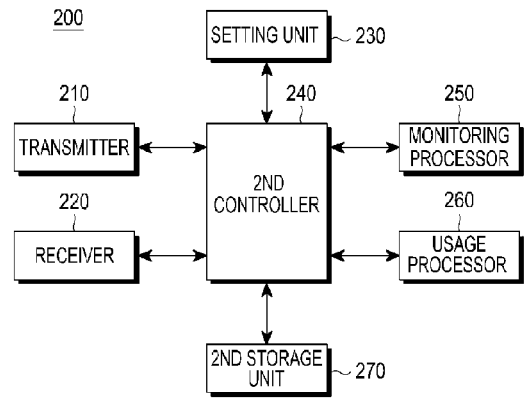
FIG. 6 is a block diagram illustrating a PCEF according to an embodiment of the present invention.

FIG. 6 is a block diagram illustrating a PCEF according to an embodiment of the present invention.

Referring to FIG. 6, the PCEF 200 includes a transmitter 210, a receiver 220, a setting unit 230, a second controller 240, a monitoring processor 250, a usage processor 260, and a second storage unit 270.

The transmitter 210 accesses the PCRF 150 and transmits data to the PCRF 150. Specifically, under the control of the second controller 240, the transmitter 210 may transmit a CCR command message for requesting a PCC rule to the PCRF 150.

The receiver 220 accesses the PCRF 150 and receives data from the PCRF 150. Specifically, the receiver 220 receives a command message including information necessary for setting of a PCC rule. In this event, the receiver 220 may receive a CCA command message or a RAR command message from the PCRF 150, as a response to the CCR command message.

The setting unit 230 sets a PCC rule and a monitoring key of the PCC rule based on the command message received through the receiver 220 from the PCRF 150. In other words, the setting unit 230 sets a PCC rule based on a Charging-Rule-Name AVP within a Charging-Rule-Definition AVP included in the command message. The setting unit 230 sets a monitoring key by identifying an identifier of a usage monitoring control instance for monitoring a PCC rule based on a Monitoring-Key-List AVP within a Charging-Rule-Definition AVP included in the command message.

The second controller 240 controls general operations of the PCEF 200. That is, the second controller 240 controls the transmitter 210, the receiver 220, the setting unit 230, the monitoring processor 250, the usage processor 260, and the second storage unit 270, which are elements of the PCEF 200. In other words, the second controller 240 controls the transmitter 210 to transmit a CCR command message to the PCRF 150. For example, the second controller 240 may generate a CCR command message and control the transmitter 210 to transmit the generated CCR command message through the transmitter 210, in order to request a PCC rule from the PCRF 150. Further, in at least one case among a case where the service usage reaches a limit value, a case where the session terminates, and a case where the PCRF 150 has requested reporting of the service usage, the second controller 240 may transmit a CCR command message requesting a PCC rule to the PCRF 150 and may report the usage monitored up to the present to the PCRF 150. When receiving a command message from the PCRF 150 through the receiver 220, the second controller 240 sets a PCC rule and controls the setting unit 230 to set a monitoring key.

The monitoring processor 250 sets a range of the monitoring of the PCC rule based on the number of instances included in the command message and performs the monitoring based on the set range of the monitoring. Specifically, the monitoring processor 250 can determine whether a PCC rule should be monitored at a session level and can determine the range of the monitoring, by comparing the number of Monitoring-Key AVPs with a value of the Number-of-Instances AVP included in the Monitoring-Key-List AVP within a Charging-Rule-Definition AVP included in the command message. That is, when a difference between the number Nkey of Monitoring-Key AVPs and the value Ninst of the Number-of-Instances AVP included in the Monitoring-Key-List AVP is 1, the monitoring processor 250 may set the range of the monitoring such that the monitoring can be performed at a session level. In other words, when the difference between the value Ninst of the Number-of-Instances AVP and the number Nkey of Monitoring-Key AVPs included in the Monitoring-Key-List AVP is 1, the monitoring processor 250 may set the range of the monitoring such that the PCC rule is included in the session level monitoring. Meanwhile, when the difference between the value Ninst of the Number-of-Instances AVP and the number Nkey of Monitoring-Key AVPs included in the Monitoring-Key-List AVP is 0, the monitoring processor 250 may set the range of the monitoring such that the monitoring is not performed at a session level but can be performed at a group level. Here, monitoring at the group level implies that monitoring is performed according to each monitoring group for the PCC rule.

Further, the monitoring processor 250 performs the monitoring of the PCC rule based on the set range of monitoring. That is, the monitoring processor 250 may perform the monitoring at the session level or the group level according to the difference between the value Ninst of the Number-of-Instances AVP and the number Nkey of Monitoring-Key AVPs included in the Monitoring-Key-List AVP.

The usage processor 260 determines the monitoring level and sets a limit value of the usage, based on the command message. In other words, based on a Usage-Monitoring-Information AVP included in a command message, the usage processor 260 determines the monitoring level of a usage monitoring control instance. That is, based on a Usage-Monitoring-Information AVP indicates whether the monitoring will be performed at a session level or a group level, the usage processor 260 determines at least one monitoring level among the session level and the monitoring group level. Further, the usage processor 260 sets a limit vale for reporting of the usage, based on the Usage-Monitoring-Information AVP included in the command message.

The second storage unit 270 stores various programs for controlling general operations of the PCEF 200, various data generated by execution of the programs, and acquired data. For example, the second storage unit 270 may store a CCR command message transmitted to the PCRF 150 through the transmitter 210. The second storage unit 270 may store a PCC rule set by the setting unit 230 and a monitoring key of the PCC rule. The second storage unit 270 may store a range of the monitoring set by the monitoring processor 250.

In the meantime, the second storage unit 270 may provide necessary data in response to a request from the receiver 220, the setting unit 230, the second controller 240, the monitoring processor 250, or the usage processor 260. The second storage unit 270 may either be configured by an integrated memory or include a plurality of separate memories. For example, the second storage unit 270 may include a Read Only Memory (ROM), a Random Access Memory (RAM), a flash memory, etc.

Hereinafter, setting of Monitoring-Key-List AVPs by a PCRF according to various embodiments will be described with reference to FIGS. 7A to 8E. FIGS. 7A to 8E illustrate examples for describing Monitoring-Key-List AVPs according to various embodiments of the present invention.

Figure 7A:
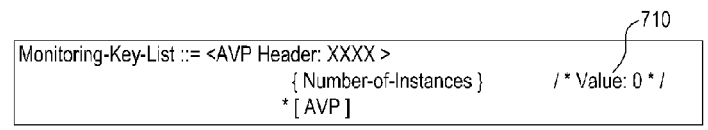
FIGS. 7A to 8E illustrate examples for describing Monitoring-Key-List AVPs according to various embodiments of the present invention.

Referring to FIGS. 7A to 8E, the PCRF 150 generates a Monitoring-Key-List AVP as shown in FIG. 7A, so as to prevent monitoring of a PCC rule from being executed at either of the group level or the session level. That is, as shown in FIG. 7A, the PCRF 150 sets a value of a Number-of-Instances AVP to 0 as indicated by reference numeral 710 and does not allocate a Monitoring-Key AVP to a Monitoring-Key-List AVP. Here, monitoring at a group level refers to monitoring for each group allocated the same monitoring key, and monitoring at a session level refers to monitoring for a service within an IP-CAN session.

Further, the PCEF 200 may receive a command message including a Monitoring-Key-List AVP shown in FIG. 7A from the PCRF 150, and may identify, based on the received Monitoring-Key-List AVP, that a difference between the value of the Number-of-Instances AVP and the number of Monitoring-Key AVPs included in the Monitoring-Key-List AVP is 0. That is, since the difference between the value of the Number-of-Instances AVP and the number of Monitoring-Key AVPs included in the Monitoring-Key-List AVP is 0, the PCEF 200 can identify that monitoring at a session level is not performed. Therefore, the PCEF 200 sets a monitoring range of the PCC rule, so as to prevent monitoring of the PCC rule from being executed at either of the group level or the session level.

Figure 7B:
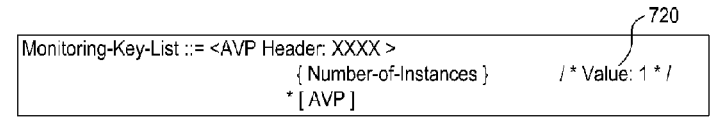

Also, the PCRF 150 may generate a Monitoring-Key-List AVP as shown in FIG. 7B, so as to prevent monitoring of a PCC rule from being executed at the group level while allowing monitoring of the PCC rule to be executed at the session level. That is, as shown in FIG. 7B, since the monitoring is performed at the session level, the PCRF 150 sets a value of a Number-of-Instances AVP to 1.

Further, the PCEF 200 may receive a command message including a Monitoring-Key-List AVP shown in FIG. 7B from the PCRF 150, and may identify, based on the received Monitoring-Key-List AVP, that the difference between the value of the Number-of-Instances AVP and the number of Monitoring-Key AVPs included in the Monitoring-Key-List AVP is 1. That is, since the difference between the value of the Number-of-Instances AVP and the number of Monitoring-Key AVPs included in the Monitoring-Key-List AVP is 1, the PCEF 200 can identify that monitoring at a session level is performed. Therefore, the PCEF 200 sets a monitoring range of the PCC rule, so as to allow monitoring of the PCC rule to be executed at the session level. Further, since the Monitoring-Key-List AVP does not include a Monitoring-Key AVP, the PCEF 200 sets the monitoring range of the PCC rule, so as to prevent monitoring of the PCC rule from being executed at the group level.

Figure 7C:
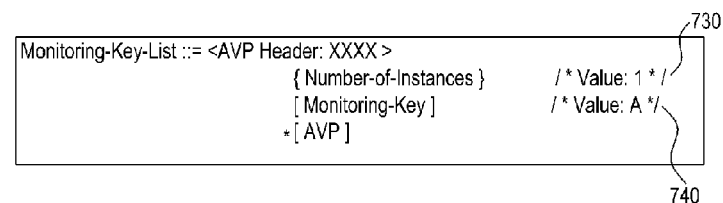

Also, the PCRF 150 may generate a Monitoring-Key-List AVP as shown in FIG. 7C, so as to prevent monitoring of a PCC rule from being executed at the session level while allowing monitoring of the PCC rule to be executed at the usage monitoring control instance A corresponding to the group monitoring level. That is, as shown in FIG. 7C, since the monitoring is performed at one group monitoring level, the PCRF 150 sets a value of the Number-of-Instances AVP within the Monitoring-Key-List AVP to 1 as indicated by reference numeral 730 while setting a value of the Monitoring-Key AVP to A as indicated by reference numeral 740.

Further, the PCEF 200 may receive a command message including a Monitoring-Key-List AVP shown in FIG. 7C from the PCRF 150, and may identify, based on the received Monitoring-Key-List AVP, that the difference between the value of the Number-of-Instances AVP and the number of Monitoring-Key AVPs included in the Monitoring-Key-List AVP is 0. That is, since the difference between the value of the Number-of-Instances AVP and the number of Monitoring-Key AVPs included in the Monitoring-Key-List AVP is 0, the PCEF 200 can identify that monitoring at the session level is not performed. Therefore, the PCEF 200 sets a monitoring range of the PCC rule, so as to prevent monitoring of the PCC rule from being executed at the session level while allowing the monitoring to be executed at the usage monitoring control instance A corresponding to the group level.

Figure 8A:
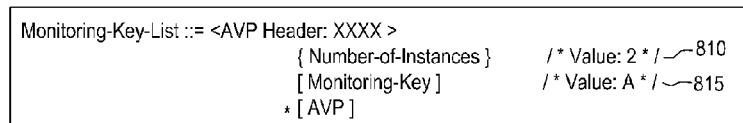

Also, the PCRF 150 may generate a Monitoring-Key-List AVP as shown in FIG. 8A, so as to allow monitoring of a PCC rule to be executed both at the session level and at the usage monitoring control instance A corresponding to the group monitoring level. That is, as shown in FIG. 8A, since the monitoring is performed both at the session level and at the group monitoring level, the PCRF 150 sets a value of the Number-of-Instances AVP within the Monitoring-Key-List AVP to 2 as indicated by reference numeral 810 while setting a value of the Monitoring-Key AVP to A as indicated by reference numeral 815.

Further, the PCEF 200 may receive a command message including a Monitoring-Key-List AVP shown in FIG. 8A from the PCRF 150, and may identify, based on the received Monitoring-Key-List AVP, that the difference between the value of the Number-of-Instances AVP and the number of Monitoring-Key AVPs included in the Monitoring-Key-List AVP is 1. That is, since the difference between the value of the Number-of-Instances AVP and the number of Monitoring-Key AVPs included in the Monitoring-Key-List AVP is 1, the PCEF 200 can identify that monitoring at the session level is performed. Therefore, the PCEF 200 sets a monitoring range of the PCC rule, so as to allow the monitoring to be executed both at the session level and at the usage monitoring control instance A corresponding to the group monitoring level.

Figure 8B:
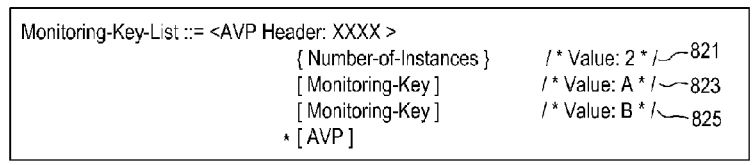

Also, the PCRF 150 may generate a Monitoring-Key-List AVP as shown in FIG. 8B, so as to allow monitoring of a PCC rule to be executed both at the usage monitoring control instances A and B corresponding to group monitoring levels while preventing the monitoring from being executed at the session level. That is, as shown in FIG. 8B, since the monitoring is performed at the two group monitoring levels, the PCRF 150 sets a value of the Number-of-Instances AVP within the Monitoring-Key-List AVP to 2 as indicated by reference numeral 821 while setting values of the Monitoring-Key AVP to A as indicated by reference numeral 823 and B as indicated by reference numeral 825.

Further, the PCEF 200 may receive a command message including a Monitoring-Key-List AVP shown in FIG. 8B from the PCRF 150, and may identify, based on the received Monitoring-Key-List AVP, that the difference between the value of the Number-of-Instances AVP and the number of Monitoring-Key AVPs included in the Monitoring-Key-List AVP is 0. That is, since the difference between the value of the Number-of-Instances AVP and the number of Monitoring-Key AVPs included in the Monitoring-Key-List AVP is 0, the PCEF 200 can identify that monitoring at the session level is not performed. Therefore, the PCEF 200 sets a monitoring range of the PCC rule, so as to allow the monitoring to be executed at the usage monitoring control instances A and B corresponding to group monitoring levels while preventing the monitoring from being executed at the session level.

Also, the PCRF 150 may generate a Monitoring-Key-List AVP as shown in FIG. 8C, so as to allow monitoring of a PCC rule to be executed both at the usage monitoring control instances A and B corresponding to group monitoring levels while allowing the monitoring to be executed at the session level also. That is, as shown in FIG. 8C, since the monitoring is performed at the two group monitoring levels and at the session level, the PCRF 150 sets a value of the Number-of-Instances AVP within the Monitoring-Key-List AVP to 3 as indicated by reference numeral 831 while setting values of the Monitoring-Key AVP to A as indicated by reference numeral 833 and B as indicated by reference numeral 835.

Further, the PCEF 200 may receive a command message including a Monitoring-Key-List AVP shown in FIG. 8C from the PCRF 150, and may identify, based on the received Monitoring-Key-List AVP, that the difference between the value of the Number-of-Instances AVP and the number of Monitoring-Key AVPs included in the Monitoring-Key-List AVP is 1. That is, since the difference between the value of the Number-of-Instances AVP and the number of Monitoring-Key AVPs included in the Monitoring-Key-List AVP is 1, the PCEF 200 can identify that monitoring at the session level is performed. Therefore, the PCEF 200 sets a monitoring range of the PCC rule, so as to allow the monitoring to be executed at all of the session level and the usage monitoring control instances A and B corresponding to group monitoring levels.

Also, the PCRF 150 may change a Monitoring-Key-List AVP generated as shown in FIG. 8D into a Monitoring-Key-List AVP as shown in FIG. 8E, so as to change the monitoring of a PCC rule executed at all of the session level and the usage monitoring control instances A and B to monitoring of a PCC rule executed only at the session level and at the usage monitoring control instance A. That is, as shown in FIGS. 8D and 8E, the PCRF 150 changes the value of the Number-of-Instances AVP within the Monitoring-Key-List AVP from 3 as indicated by reference numeral 841 to 2 as indicated by reference numeral 850 and deletes the Monitoring-Key AVP B as indicated by reference numeral 845 while leaving only the Monitoring-Key AVP A as indicated by reference numeral 843 among the Monitoring-Key AVPs A and B.

Further, in order to change the Monitoring-Key-List AVP as shown in FIG. 8D into the Monitoring-Key-List AVP as shown in FIG. 8E, the PCEF 200 receives a command message including a Monitoring-Key-List AVP shown in FIG. 8E from the PCRF 150. Also, the PCEF 200 can identify, based on the received Monitoring-Key-List AVP, that the difference between the value of the Number-of-Instances AVP and the number of Monitoring-Key AVPs included in the Monitoring-Key-List AVP is 1. That is, since the difference between the value of the Number-of-Instances AVP and the number of Monitoring-Key AVPs included in the Monitoring-Key-List AVP is 1, the PCEF 200 can identify that monitoring at the session level is performed. Further, by comparing the Monitoring-Key-List AVP an the Monitoring-Key-List AVP as shown in FIG. 8E, the PCEF 200 can identify that only the usage monitoring control instance A is allocated a value while the usage monitoring control instance B has been deleted. Therefore, the PCEF 200 deletes the usage monitoring control instance B in the PCC rule already set based on the Monitoring-Key-List AVP shown in FIG. 8E, so as to change the range of the monitoring so that the monitoring can be performed at the session level and at the usage monitoring control instance A.

FIG. 9 is a flowchart illustrating a method of setting a PCC rule by a PCC rule setting system according to an embodiment of the present invention. FIG. 9 is based on, as an example, a PUSH procedure in which a PCC rule is set by transmission of a RAR command message by a PCRF without transmission of a message for requesting a PCC rule from a PCEF to the PCRF.

Referring to FIG. 9, the PCRF 150 determines a PCC rule for a packet service (step 910). That is, the PCRF 150 may determine a PCC rule based on information received from the AF 170 or the GGSN 140.

The PCRF 150 generates a RAR command message in order to provide a PCC rule (step 920). In other words, the PCRF 150 generates an RAR command message including a Usage-Monitoring-Information AVP and a Charging-Rule-Install AVP including a Charging-Rule-Definition AVP. The Charging-Rule-Definition AVP includes a Monitoring-Key-List AVP, and the Monitoring-Key-List AVP includes a Number-of-Instances AVP and a Monitoring-Key AVP corresponding to a pertinent PCC rule. Meanwhile, when monitoring is not performed at the monitoring group level, the Monitoring-Key AVP may not be allocated to the Monitoring-Key-List AVP.

The PCRF 150 transmits an RAR command message to the PCEF 200 (step 930).

Based on the RAR command message received from the PCRF 150, the PCEF 200 sets a PCC rule (step 940). That is, the PCEF 200 sets a PCC rule based on a Charging-Rule-Name AVP within a Charging-Rule-Definition AVP included in the RAR command message.

The PCEF 200 sets a monitoring key of the PCC rule based on the RAR command message (step 950). In other words, the PCEF 200 sets a monitoring key by identifying an identifier of a usage monitoring control instance to monitor the PCC rule, based on the Monitoring-Key-List AVP within the Charging-Rule-Definition AVP included in the RAR command message. Meanwhile, when a Monitoring-Key AVP has not been allocated to the Monitoring-Key-List AVP, the PCEF 200 may not set a monitoring key of the PCC rule.

The PCEF 200 determines a monitoring level of a usage monitoring control instance based on the RAR command message (step 960). In other words, based on a Usage-Monitoring-Information AVP within the RAR command message, the PCEF 200 may determine a monitoring level of a usage monitoring control instance corresponding to at least one of the session level and the monitoring group level.

The PCEF 200 transmits a Re-Auth-Answer (RAA) command message to the PCRF 150 (step 970). That is, the PCEF 200 generates an RAA message and transmits the RAA message to the PCRF 150, in order to notify the PCRF 150 that a PCC rule has been set.

FIG. 10 is a flowchart illustrating a method of setting a PCC rule by a PCC rule setting system according to another embodiment of the present invention. FIG. 10 is based on, as an example, a PULL procedure in which a PCEF transmits a CCR message for requesting a PCC rule to the PCRF and then receives a CCA command message as a response to the CCR command message from the PCRF, so as to set a PCC rule.

Referring to FIG. 10, the PCEF 200 transmits a CCR command message to the PCRF 150 in order to request a PCC rule (step 1010).

In at least one case among a case where the service usage reaches a limit value, a case where the session terminates, and a case where the PCRF 150 has requested reporting of the service usage, the PCEF 200 may generate a CCR command message.

The PCEF 200 transmits the generated CCR command message to the PCRF 150 (step 1015).

Upon receiving the CCR command message from the PCEF 200, the PCRF 150 determines a PCC rule for a packet service (step 1020). That is, the PCRF 150 may determine a PCC rule to be transmitted to the PCEF 200, based on packet service-related information and user-requested subscriber information, for each UE 110.

The PCRF 150 generates a CCA command message which includes the determined PCC rule and corresponds to a response to the CCR command message (step 1025). That is, the PCRF 150 generates a CCA command message which includes a Usage-Monitoring-Information AVP and a Charging-Rule-Definition AVP including a Monitoring-Key-List AVP, in order to set the PCC rule and a monitoring key of the PCC rule.

The PCRF 150 transmits the generated CCA command message to the PCEF 200 (step 1030).

The PCEF 200 sets the PCC rule based on the Charging-Rule-Name AVP within the Charging-Rule-Definition AVP included in the CCA command message (step 1035).

The PCEF 200 sets at least one monitoring key corresponding to the PCC rule based on the Monitoring-Key AVP within the Monitoring-Key-List AVP included in the CCA command message (step 1040). Meanwhile, when the Monitoring-Key-List AVP does not include the Monitoring-Key AVP, the PCEF 200 may not set a monitoring key of the PCC rule.

The PCEF 200 determines a monitoring level based on the Usage-Monitoring-Information AVP included in the CCA command message (step 1045).

The PCEF 200 transmits an RAA message to the PCRF 150 (step 1050).

Figure 11:
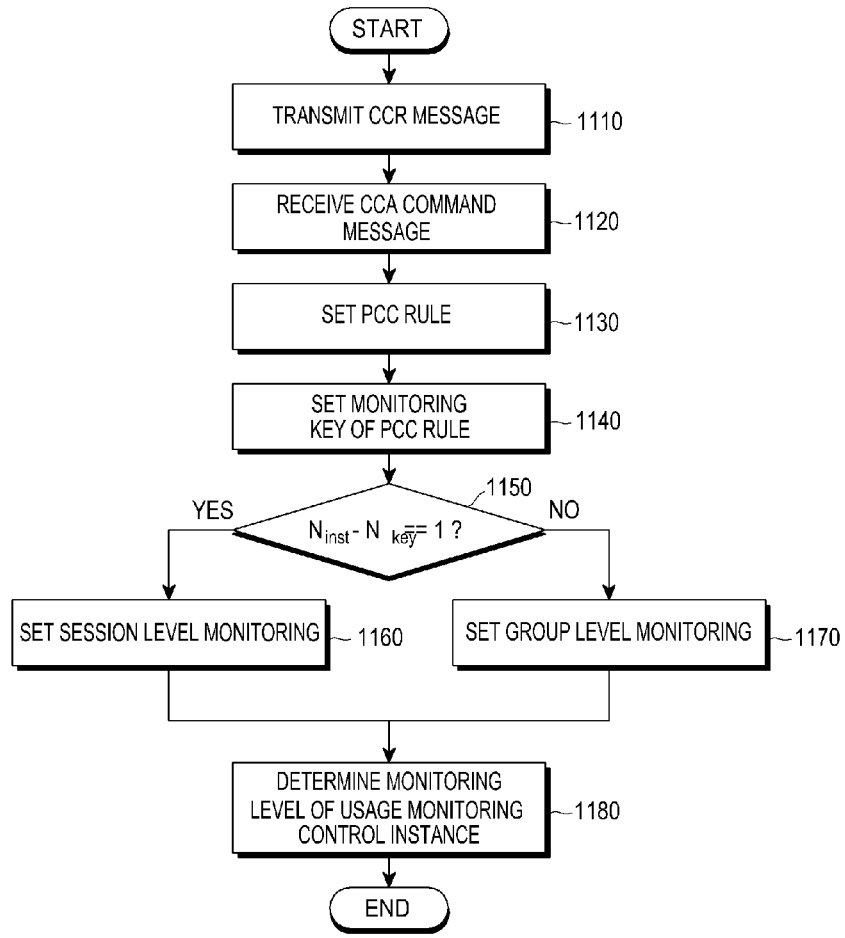
FIG. 11 is a flowchart illustrating a method of setting a PCC rule by the PCEF of FIG. 10.

FIG. 11 is a flowchart illustrating a method of setting a PCC rule by the PCEF of FIG. 10. Elements of the PCEF 200 according to an embodiment of the present invention described above with reference to FIG. 6 may be either integrated or departmentalized. Therefore, it should be noted that an element performing the abovementioned function may belong to the PCEF 200 according to an embodiment of the present invention regardless of the name of the element. Therefore, in the following description on the method of setting a PCC rule according to an embodiment of the present invention, it is assumed that the subject of each step is the PCEF 200 instead of a corresponding element.

Referring to FIG. 11, the PCEF 200 generates a CCR message and transmits the CCR message to the PCRF 150 in order to request a PCC rule from the PCRF 150 (step 1110).

Then, the PCEF 200 receives a CCA command message including a Number-of-Instances AVP and a Monitoring-Key-List AVP corresponding to the PCC rule in response to the CCR message from the PCRF 150 (step 1120).

The PCEF 200 sets the PCC rule based on the Charging-Rule-Name AVP within the Charging-Rule-Definition AVP included in the CCA command message (step 1130).

The PCEF 200 sets a monitoring key by identifying an identifier of a usage monitoring control instance for monitoring the PCC rule based on the Monitoring-Key-List AVP included in the CCA command message (step 1140). Meanwhile, when the Monitoring-Key-List AVP does not include a Monitoring-Key AVP, the PCEF 200 may perform step 1150 without setting a monitoring key of the PCC rule.

Based on the Monitoring-Key-List AVP included in the CCA command message, the PCEF 200 determines whether a difference between the value Ninst of the Number-of-Instances AVP and the number Nkey of Monitoring-Key AVPs included in the Monitoring-Key-List AVP is 1 (step 1150).

When the difference between the value Ninst of the Number-of-Instances AVP and the number Nkey of Monitoring-Key AVPs included in the Monitoring-Key-List AVP is 1, the PCEF 200 sets a monitoring range of the PCC rule at a session level (step 1160).

When the difference between the value Ninst of the Number-of-Instances AVP and the number Nkey of Monitoring-Key AVPs included in the Monitoring-Key-List AVP is 0, the PCEF 200 sets a monitoring range of the PCC rule at a group level (step 1170). Meanwhile, when the Monitoring-Key-List AVP does not include a Monitoring-Key AVP, the PCEF 200 may not set the monitoring range of the PCC rule at the group level.

The PCEF 200 determines the monitoring level based on the Usage-Monitoring-Information AVP included in the CCA command message (step 1180). Further, the PCEF 200 sets a limit value for reporting of the usage based on the Usage-Monitoring-Information AVP included in the CCA command message.

Figure 12:
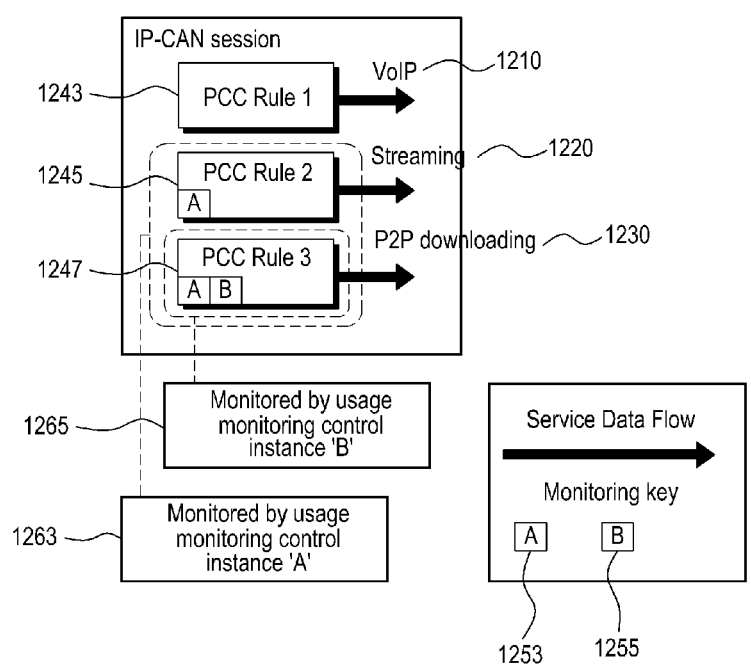
FIG. 12 is a view illustrating an example of application of a PCC rule according to an embodiment of the present invention.

FIG. 12 is a view illustrating an example of application of a PCC rule according to an embodiment of the present invention, FIG. 13 is a view illustrating examples of a Monitoring-Key-List AVP and a Charging-Rule-Definition AVP for application of the PCC rule of FIG. 12, and FIG. 14 is a view illustrating examples of a Usage-Monitoring-Information AVP for application of the PCC rule of FIG. 12.

FIGS. 12 to 14 are based on an assumption, as an example, that a VoIP service 1210 within an IP-CAN session is not monitored in any usage monitoring control instance, a streaming service 1220 is monitored in a usage monitoring control instance A 1253, and a P2P downloading service 1230 is monitored in both the usage monitoring control instance A 1253 and a usage monitoring control instance B 1255.

Within an IP-CAN session, a VoIP service 1210, a streaming service 1220, and a P2P downloading service 1230 are being provided, wherein PCC rule 1 1243 corresponds to the VoIP service 1210, PCC rule 2 1245 corresponds to the streaming service 1220, and PCC rule 3 1247 corresponds to the P2P downloading service 1230. Further, a usage monitoring control instance A 1263 monitors PCC rule 2 1245 and PCC rule 3 1247 and a usage monitoring control instance B 1265 monitors PCC rule 3 1247.

The PCRF 150 generates a command message including a Charging-Rule-Definition AVP for each PCC rule. That is, as shown in FIG. 13, the PCRF 150 generates a Charging-Rule-Definition AVP 1310 corresponding to PCC rule 1 and generates a Monitoring-Key-List AVP 1315 within the Charging-Rule-Definition AVP 1310. Here, since the VoIP service 1210 is not monitored in any usage monitoring control instance, the value of the Number-of-Instances AVP within the Monitoring-Key-List AVP 1315 may be set to 0.

Further, the PCRF 150 generates a Charging-Rule-Definition AVP 1320 corresponding to PCC rule 2 and generates a Monitoring-Key-List AVP 1325 within the Charging-Rule-Definition AVP 1320. In this event, since the streaming service 1220 is monitored in the usage monitoring control instance A 1253, the value of the Number-of-Instances AVP within the Monitoring-Key-List AVP 1325 may be set to 1 while the value of the monitoring key is set to A.

Further, the PCRF 150 generates a Charging-Rule-Definition AVP 1330 corresponding to PCC rule 3 and generates a Monitoring-Key-List AVP 1335 within the Charging-Rule-Definition AVP 1330. Here, since the P2P downloading service 1230 is monitored in both the usage monitoring control instance A 1253 and the usage monitoring control instance B 1255, the value of the Number-of-Instances AVP within the Monitoring-Key-List AVP 1335 may be set to 2 while the values of the monitoring key are set to A and B.

The PCRF 150 generates a Usage-Monitoring-Information AVP. In other words, as shown in FIG. 14, the PCRF 150 generates a Usage-Monitoring-Information AVP 1410 for the usage monitoring control instance A. The PCRF 150 sets a PCC rule, in which a usage monitoring control instance A has a monitoring key of A, to PCC_RULE_LEVEL(1), and sets such that it is reported to the PCEF 200 when the usage of the P2P downloading service and a streaming service monitored in the usage monitoring control instance A 1253 reaches a preset capacity, for example 50 Mbytes. Here, PCC_RULE_LEVEL(1) refers to execution of monitoring at a monitoring group level.

In the Usage-Monitoring-Information AVP 1420 relating to the usage monitoring control instance B 1255, a PCC rule in which a usage monitoring control instance B 1255 has a monitoring key of B is set to PCC_RULE_LEVEL(1) and it is reported to the PCEF 200 when the usage of the P2P downloading service and a streaming service monitored in the usage monitoring control instance B 1255 reaches a preset capacity, for example 10 Mbytes.

Figure 15:
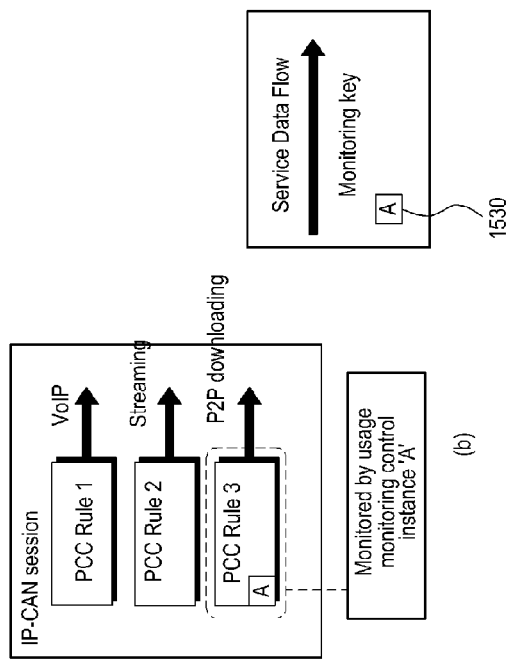
FIG. 15 is a view illustrating an example of application of a PCC rule according to another embodiment of the present invention.
Figure 16:
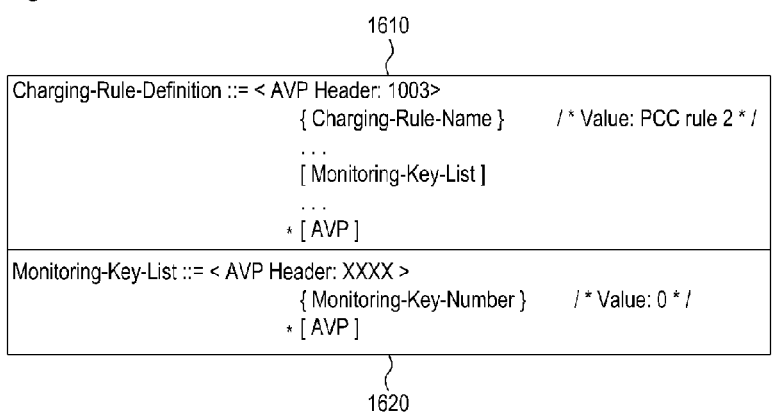
FIG. 16 is a view illustrating examples of a Monitoring-Key-List AVP and a Charging-Rule-Definition AVP for changing the PCC rule of FIG. 15.

FIG. 15 is a view illustrating an example of application of a PCC rule according to another embodiment of the present invention and FIG. 16 is a view illustrating examples of a Monitoring-Key-List AVP and a Charging-Rule-Definition AVP for changing the PCC rule of FIG. 15.

FIGS. 15 to 16 show an example of change from monitoring of a streaming service and an FTP downloading service, which is performed in the usage monitoring control instance 1530 as shown in FIG. 15(*a*), to monitoring of only the FTP downloading service performed in the usage monitoring control instance 1530 as shown in FIG. 15(*b*) by deleting the streaming service from the monitoring in response to a user's request.

Within an IP-CAN session, when a VoIP service, a streaming service, and a P2P downloading service are being provided, PCC rule 2 1510 corresponds to the streaming service and PCC rule 3 1520 corresponds to the P2P downloading service. At first, a monitoring key A has been allocated to PCC rule 2 1510 and PCC rule 3 1520. Then, the monitoring key A of PCC rule 2 1510 is deleted. Therefore, the usage monitoring control instance A first monitors PCC rule 2 1510 and PCC rule 3 1520. After the PCC rule is changed, the usage monitoring control instance A first monitors only PCC rule 3 1520.

In order to change the PCC rule, the PCRF 150 generates a Charging-Rule-Definition AVP 1610 corresponding to PCC rule 2 1510 as shown in FIG. 16. That is, the PCRF 150 deletes A, which is the value of the existing Monitoring-Key AVP, and applies a changed PCC rule, so as to generate a changed Monitoring-Key-List AVP 1620 which does not include a Monitoring-Key AVP and has a Number-of-Instances AVP changed into 0. Based on the Monitoring-Key-List AVP 1620 generated by the PCRF 150, the PCEF 200 deletes the usage monitoring control instance A corresponding to PCC rule 2 1510, so as to change the PCC rule.

Figure 19:
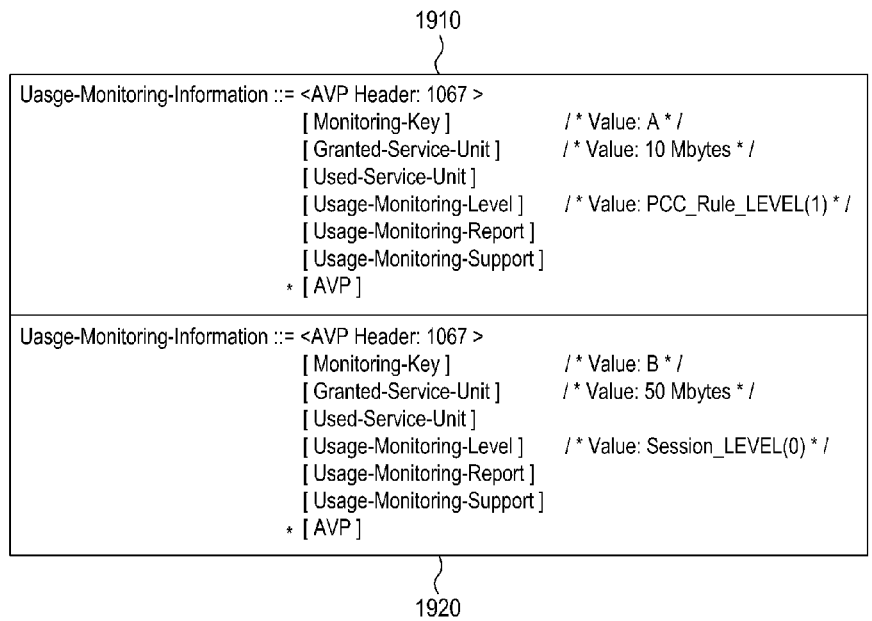
FIG. 19 is a view illustrating examples of a Usage-Monitoring-Information AVP for application of the PCC rule of FIG. 17.

FIG. 17 is a view illustrating an example of application of a PCC rule according to another embodiment of the present invention, FIG. 18 is a view illustrating examples of a Monitoring-Key-List AVP and a Charging-Rule-Definition AVP for application of the PCC rule of FIG. 17, and FIG. 19 is a view illustrating examples of a Usage-Monitoring-Information AVP for application of the PCC rule of FIG. 17.

FIGS. 17 to 19 are based on an assumption, as an example, that a session level monitoring is being performed for a particular user and a streaming service is excluded from monitoring at the session level but is monitored in a monitoring group A 1730.

Within an IP-CAN session, when a VoIP service, a streaming service, and a P2P downloading service are being provided, PCC rule 1 1713 corresponds to the VoIP service, PCC rule 2 1715 corresponds to the P2P downloading service. Further, PCC rule 3 1717 corresponds to the streaming service and is allocated a monitoring key A 1720. In FIG. 17, PCC rule 1 1713 and PCC rule 2 1715 are monitored only at the session level 1740, while PCC rule 3 1719 is monitored in the usage monitoring control instance A 1720 and is excluded from the monitoring of the session level 1740.

As shown in FIG. 18, the PCRF 150 generates a Charging-Rule-Definition AVP 1810 corresponding to PCC rule 1 and generates a Monitoring-Key-List AVP 1815 within the Charging-Rule-Definition AVP 1810. In this event, since the VoIP service is monitored only at the session level, the value of the Number-of-Instances AVP within the Monitoring-Key-List AVP 1315 may be set to 1.

Further, the PCRF 150 generates a Charging-Rule-Definition AVP 1820 corresponding to PCC rule 2 and generates a Monitoring-Key-List AVP 1825 within the Charging-Rule-Definition AVP 1810. In this event, since the P2P downloading service is monitored only at the session level, the value of the Number-of-Instances AVP within the Monitoring-Key-List AVP 1325 may be set to 1.

Also, the PCRF 150 generates a Charging-Rule-Definition AVP 1830 corresponding to PCC rule 3 and generates a Monitoring-Key-List AVP 1835 within the Charging-Rule-Definition AVP 1830. In this event, since the streaming service is monitored in the usage monitoring control instance A 1253 and is not monitored at the session level, the PCRF 150 may set the value of the Number-of-Instances AVP within the Monitoring-Key-List AVP 1335 to 1 while setting the value of the Monitoring-Key AVP to A.

As shown in FIG. 19, the PCRF 150 generates a Usage-Monitoring-Information AVP 1910 for the usage monitoring control instance A. The PCRF 150 sets a PCC rule, in which a usage monitoring control instance A has a monitoring key A, to PCC_RULE_LEVEL(1), and sets such that it is reported to the PCEF 200 when the usage reaches 10 Mbytes. In this event, PCC_RULE_LEVEL(1) refers to execution of monitoring at a monitoring group level.

In the Usage-Monitoring-Information AVP 1920 relating to the usage monitoring control instance B, the PCRF 150 sets a PCC rule in which a usage monitoring control instance B has a monitoring key of B to PCC_RULE_LEVEL(1) and sets such that it is reported to the PCEF 200 when the usage reaches 50 Mbytes. In this event, PCC_RULE_LEVEL(1) refers to execution of monitoring at a session level.

While the present invention has been shown and described with reference to certain embodiments thereof, it will be understood by those skilled in the art that various changes in form and details may be made therein without departing from the spirit and scope of the present invention as defined by the appended claims.

The invention claimed is:

1. A policy and charging enforcement function (PCEF) apparatus for monitoring service usage in a mobile communication network, the PCEF apparatus comprising:
a receiver configured to receive, from a policy and charging rules function (PCRF) apparatus, a command message including a number of instances for monitoring a policy and charging control (PCC) rule and at least one monitoring key identifying each of the instances for monitoring the PCC rule;
a controller configured to generate the PCC rule based on the number of instances for monitoring the PCC rule and the at least one monitoring key, and determine a monitoring level of the PCC rule and a threshold value for reporting service usage; and
a monitoring processor configured to monitor the service usage based on the monitoring level and the threshold value.

2. The PCEF apparatus of claim 1, wherein the controller is further configured to determine the monitoring level of the PCC rule as a session level, if a difference between the number of instances and a number of the at least one monitoring key is 1, and
wherein the monitoring processor is further configured to monitor the service usage within a session based on the session level.

3. The PCEF apparatus of claim 1, wherein the controller is further configured to determine the monitoring level of the PCC rule as a group level, if a difference between the number of instances and a number of the at least one monitoring key is 0, and
wherein the monitoring processor is further configured to monitor the service usage related to PCC rules including an identical monitoring key based on the group level.

4. The PCEF apparatus of claim 1, wherein the command message further includes usage monitoring information, and
wherein the controller is further configured to determine the monitoring level of the PCC rule based on the usage monitoring information, and determine the threshold value based on the monitoring level of the PCC rule.

5. The PCEF apparatus of claim 1, wherein the command message further includes a charge rule name, and
wherein the PCC rule is generated based on the number of instances for monitoring the PCC rule, the at least one monitoring key, and the charge rule name.

6. The PCEF apparatus of claim 1, further comprising a transmitter configured to transmit, to the PCRF apparatus, a credit control request (CCR) command message for requesting the PCC rule.

7. The PCEF apparatus of claim 6, wherein the receiver is further configured to receive, from the PCRF apparatus, a credit control answer (CCA) command message including the number of instances for monitoring the PCC rule and the at least one monitoring key.

8. The PCEF apparatus of claim 1, wherein the receiver is further configured to receive, from the PCRF apparatus, a re-auth request (RAR) command message including the number of instances for monitoring the PCC rule and the at least one monitoring key.

9. A method of monitoring service usage by a policy and charging enforcement function (PCEF) apparatus in a mobile communication network, the method comprising:
receiving, from a policy and charging rules function (PCRF) apparatus, a command message including a number of instances for monitoring a policy and charging control (PCC) rule and at least one monitoring key identifying each of the instances;
generating the PCC rule based on the number of instances for monitoring the PCC rule and the at least one monitoring key;
determining a monitoring level of the PCC rule and a threshold value for reporting service usage; and
monitoring the service usage based on the monitoring level and the threshold value.

10. The method of claim 9, wherein monitoring the service usage comprises:
if a difference between the number of instances for monitoring the PCC rule and a number of the at least one monitoring key is 1, determining the monitoring level of the PCC rule as a session level; and
monitoring the service usage within a session based on the session level.

11. The method of claim 9, wherein monitoring the service usage comprises:
if a difference between the number of instances for monitoring the PCC rule and a number of the at least one monitoring key is 0, determining the monitoring level of the PCC rule as a group level; and
monitoring the service usage related to PCC rules including an identical monitoring key based on the group level.

12. The method of claim 9, wherein the command message further includes usage monitoring information, and
wherein determining the monitoring level and the threshold value comprises:
determining the monitoring level of the PCC rule based on the usage monitoring information; and
determining the threshold value based on the monitoring level of the PCC rule.

13. The method of claim 9, wherein the command message further includes a charge rule name, and
wherein generating the PCC rule comprises generating the PCC rule based on the number of instances for monitoring the PCC rule, the at least one monitoring key, and the charge rule name.

14. The method of claim 9, wherein receiving the command message comprises:
Transmitting, to the PCRF apparatus a credit control request (CCR) command message for requesting the PCC rule; and
Receiving, from the PCRF apparatus, a credit control answer (CCA) command message including the number of instances for monitoring the PCC rule and the at least one monitoring key.

15. The method of claim 9, wherein receiving the command message comprises receiving, from the PCRF apparatus, a re-auth request (RAR) command message including the number of instances for monitoring the PCC rule and the at least one monitoring key.

* * * * *